July 9, 1968

J. D. GROVES ET AL 3,391,998

REDUCTION IN SCALE BUILD-UP IN THE VAPOR PHASE PRODUCTION
OF PIGMENTARY METAL OXIDES

Filed Dec. 9, 1964

INVENTORS

JAMES DENNIS GROVES
and PETER ALAN JONES

Chisholm and Spencer

ATTORNEYS

INVENTORS
JAMES DENNIS GROVES
and PETER ALAN JONES
Chisholm and Spencer
ATTORNEYS

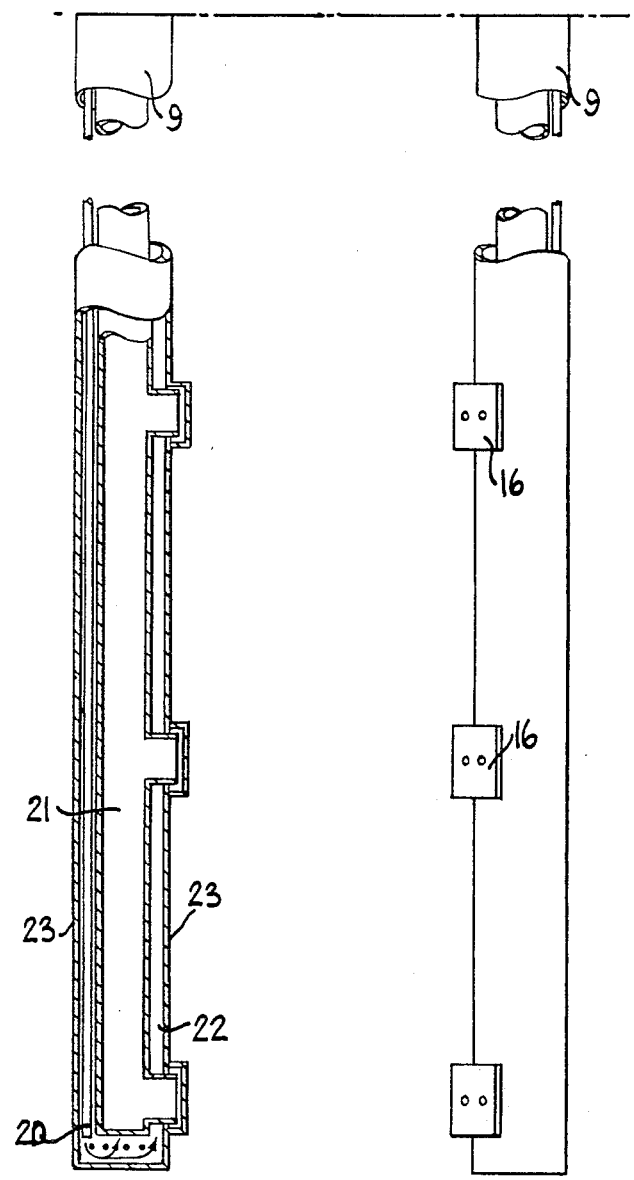

United States Patent Office 3,391,998
Patented July 9, 1968

3,391,998
REDUCTION IN SCALE BUILD-UP IN THE VAPOR PHASE PRODUCTION OF PIGMENTARY METAL OXIDES
James Dennis Groves, Redcar, and Peter Alan Jones, Norton, Stockton-on-Tees, England, assignors to British Titan Products Company, Limited, Billingham, England, a corporation of the United Kingdom
Filed Dec. 9, 1964, Ser. No. 417,130
Claims priority, application Great Britain, Dec. 12, 1963, 49,126/63
8 Claims. (Cl. 23—202)

ABSTRACT OF THE DISCLOSURE

A vapor phase oxidation of metal halides to produce pigmentary metal oxides tends to suffer losses due to the accumulation of oxidic product on the walls of the reactor. By progressively scraping the oxidic materials from the walls of the reactor during the course of the reaction and injecting reactant into the reactor from a point approximately adjacent the scraped area, a significant reduction in the losses due to accumulated scale build-up can be effected. The details for carrying out such a process and an apparatus suitable for carrying out such a process are disclosed. In particular, the apparatus includes a combination scraper-injector device.

---

Figure 4:
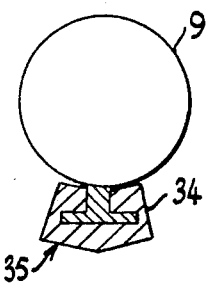

The present invention relates to improved apparatus for the production of a finely-divided metal oxide by the vapour phase oxidation (herein used to include hydrolysis) of a metal halide, and to processes for its use. Thus, the invention may be applied to the production of titanium dioxide by the vapour phase oxidation of titanium tetrahalide.

In co-pending U.S. application Ser. No. 254,007, filed Jan. 25, 1963, by Kenneth Arkless and James Dennis Groves, now abandoned, there is described and claimed a process for the production of a finely-divided metal oxide. A main feature of this process is the passing into a reaction zone of a stream of hot gas containing initial solid particles of smaller average particle size than that of the metal oxide to be produced, and introducing into the reaction zone, for example by means of an injector or injectors, a metal halide and an oxygenating gas, at least one of these reactants being introduced through a plurality of inlets spaced along the length of the zone in the direction of the gas flow.

The process of application Ser. No. 254,007 aforementioned is of great value in the production of pigmentary titanium dioxide by the oxidation of a titanium tetrahalide, particularly titanium tetrachloride, although it may also be used, for example, in the production of finely-divided zirconia, alumina or iron oxide, if desired. The novel process and apparatus disclosed herein may be employed in the production of pigmentary metal oxide by the vapour phase oxidation of a metal halide. The term "metal" as employed herein is defined as including those elements exhibiting metal-like properties including the metalloids. Examples, not by way of illustration, of metal oxides intended to be covered by the inventive process and apparatus are the oxides of aluminium, arsenic, barium, beryllium, boron, calcium, gadolinium, germanium, hafnium, lanthanum, lithium, magnesium, phosphorus, potassium, samarium, scandium, silicon, sodium, strontium, tantalum, tellurium, terbium, thorium, thulium, tin, titanium, yttrium, ytterbium, zinc, zirconium, niobium, gallium, and antimony.

The initial solid particles which are present in the hot gas stream are normally composed of the same metal oxide as that produced by the oxidation of the metal halide, although it is not essential that this should be so.

The stream of hot gas containing the initial solid particles may be formed by any suitable method. It may be formed by the vapour phase oxidation of a metal halide either in a fluidised bed or in an empty reaction zone. Heat may be provided for this oxidation reaction, particularly when conducted in an empty reaction zone, by burning a fuel in the reaction zone or by other means such as an electric arc or high frequency induction heating (as described in co-pending U.S. application Ser. No. 256,386, filed Feb. 5, 1963, by Kenneth Arkless and Dennis Cleaver, now abandoned).

The hot gas stream containing the initial solid particles should be at a sufficiently high temperature when the metal halide and oxygenating gas are introduced into the reaction zone to ensure that these compounds react quickly to form the corresponding metal oxide. This is particularly true when the desired product is pigmentary titanium oxide.

It has been found that, when carrying out the process described above, some of the metal oxide produced in the process tends to be deposited in solid form upon the walls of the reaction zone.

The presence of such a deposition on the walls of the reaction zone is a disadvantage to the reaction. For example, it can cause a substantial reduction in output of the metal oxide and, in extreme cases, plugging of the reaction zone. It may also cause uncontrolled variation of the flow of the gaseous reactants and/or reaction products through the reaction zone, with consequent variation in the quality of the product.

Particular problems arise in combating this deposit in the case of the multiple reactant entry process described above. U.S. application Ser. No. 254,007 describes two methods of providing entry ports either by providing these through the walls of the reaction chamber or by passing the reactants through a tube centrally located within the chamber and provided with a number of ports along its length. The latter ports involve the problem that the reactant gases are projected fairly quickly onto the chamber walls and hence increase the degree of build-up thereon. The ports in the chamber walls are disadvantageous as they weaken the wall, multiplying the sealing problems and increasing the number of pipe installations outside the chamber.

Moreover, such provision of a plurality of entry ports makes it difficult to remove deposit on the walls by simple mechanical scrapers. The latter, in scraping the surface of the walls, would tend to force the build-up material into entry ports provided in the walls, and hence obstruct the entry of reactants and impair the control of the process. If, on the other hand, the entry ports are provided in a centrally located tube as described above, this will tend to obstruct the passage of the mechanical scraper and will provide an enegineering problem; moreover, the provision of extra reactant injection equipment within the chamber as well as the scraper provides an undesirable multiplication of surfaces on which build-up can occur.

It is an object of the present invention to eliminate or at least control the deposit on the walls of the reaction zone while avoiding the aforesaid disadvantages. While this deposit does occur with other vapour phase oxidation processes and the present invention is applicable thereto, the present invention is especially useful with the process of multiple reactant entry described hereinabove and will be more particularly described in relation thereto.

Accordingly, the present invention is a combined scraper and injector for use in a reaction chamber for the vapour phase oxidation of metal halides comprising a reactant supply ducting for conveying reactant to at least one port leading into the reaction chamber, a scraper device carried by said ducting and means for moving the ducting whereby the scraper device can act to remove deposited metal oxide on the wall of the reaction chamber.

In a preferred form, the apparatus comprises a reactant supply pipe capable of projecting into the reaction zone and carrying at least one extension arm having its interior in communication with that of the supply pipe, and having at least one port leading into the reaction chamber, the arm being provided with a scraper device, and means to move the arm relative to the wall of the reaction chamber whereby the scraper device can act to remove deposited metal oxide from said wall.

The preferred reaction chamber in which the combined scraper/injector of the present invention is used is a shaft furnace lined with a material capable of resisting the action of reactants and reaction products and in which is formed a stream of hot gas containing initial solid particles of metal oxide of smaller size than that of the desired product. The hot gas stream containing the initial solid particles is preferably produced in the shaft furnace by the vapour phase oxidation of a metal halide in a fluidised bed or by the vapour phase oxidation of the metal halide wherein heat is applied, as described hereinabove, by burning a fuel or by electric arc or high frequency induction heating.

The reactant supply ducting should be capable of passing into the reaction zone and of forming a substantially gas-tight seal with a wall of the reaction chamber to prevent the escape of reactants and reaction products.

At least the part of the supply ducting which is exposed to the conditions existing in the reaction chamber should be made of material resistant to attack by reactants and reaction products under these conditions. In the case of the oxidation of titanium tetrachloride to titanium dioxide with the concomitant production of chlorine, nickel has been found to be a suitable material of construction, particularly when cooled, for example by circulating coolant as described later in this specification.

The part of the supply ducting outside the reaction zone is provided with ports for the introduction into the supply ducting of reactants and, if desired, of coolant.

In the preferred embodiment, if movement of the arm relative to the wall of the reaction chamber is obtained by movement of the reactant supply pipe to which it is attached, then provision may be made on that part of the supply pipe outside the reaction zone for means to move the supply pipe, for example to rotate it, e.g. backwards and forwards, about its longitudinal axis through an arc. This may be accomplished by any suitable means, for example by an electric motor operating through appropriate linkages and, if necessary, motor reversal switches.

Where the supply pipe is rotated about its longitudinal axis, it is supplied with appropriate glands to prevent leakage and flexible connections for the supply of reactants and, if desired, coolant. The supply pipe may, if desired, carry only one arm within the reaction chamber and if so, it is desirable to rotate the supply pipe about the longitudinal axis through 360° so that optimum scraping is obtained. It is preferred, therefore, to use a supply pipe carrying more than one arm and to rotate it through an appropriately smaller arc depending upon the number of arms. It has been found very convenient to provide the supply pipe with two arms and to rotate the pipe about its longitudinal axis through an arc of approximately 180°. The use of only two arms makes possible a simpler construction of pipe and arms than would be possible if more than two arms were used. It is desirable to use the smallest number of arms consistent with adequate scraping to minimise the amount of such extra apparatus within the reaction chamber.

The arms conveniently extend from the end of the supply pipe which is to project into the reaction chamber. Such arms may comprise length of tube initially projecting at an angle from the said end of the supply pipe and then extending parallel with the walls of the reaction chamber. The arms will normally be positioned close to the said walls so that the scraper device can readily scrape the walls.

The interior of the arms attached to the reactant supply pipe is in communication with the interior of the latter to allow a reactant or reactants (which may be either premixed or maintained as separate streams) introduced into the supply pipe to pass along the arms to the ports in the latter.

Normally, the length of the arms parallel to the walls of the reaction chamber and adapted to scrape deposit from them, is substantially equal to the depth of the walls which it desired to sweep with the scraper. The length which is necessary wil depend to some extent on the means used to produce the hot gas stream containing initial solid particles since the choice of the means may, to some extent, determine the point of maximum deposition. If such means is a fluidised bed with the said reaction chamber immediately above, it has been found convenient to use arms reaching to a point about 6″ to 36″ above the surface of the fluidised bed.

Since the arms, particularly when in the form of substantially vertical tubes in a shaft furnace, operate in the reaction zone at high temperature, for example in the range of 600° C. to 1400° C., it has been found advisable to cool them to prevent corrosion thereof. This can be accomplished by forming at least the lower part of the reactant supply pipe and the arms with an outer complete jacket and an inner conduit, suitably of the same material, for example nickel, and introducing between the jacket and the inner conduit, a number of small bore cooling tubes or a partition, for example again made of nickel. The cooling tubes or partition should preferably terminate at the bottom of the arms in such a manner as to allow the return of the coolant outside such tubes or partition, but still within the space between the jacket and conduit. Coolant, for example a gas such as air, or a suitable liquid coolant such as "Dowtherm," is then introduced through the cooling tubes or down one side of the partition at an appropriate pressure from which it escapes and returns beneath the jacket and is discharged through a port in the jacket outside the reaction chamber. It is preferred that the cooling of the arms be sufficient to maintain the outer wall of the jacket in contact with the reaction zone at a temperature below 500° C., most preferably below 350° C.

At least part of the surface of the arm is adapted to remove deposit from the walls of the reaction chamber. If desired, the arm may be provided with a ridge or other projection or projections but it is preferred to provide the arm with brackets to which can be fitted a scraper edge which can be renewed, if necessary. A ceramic material of suitably polygonal cross section in which an apex acts as the scraper surface has been found very satisfactory and one such cross section is shown in the accompanying drawing. The base of the ceramic scraper edge may be fashioned to slip over brackets of the appropriate shape on the arm.

It is preferred that the ceramic scraping edge extends over substantially the whole length of the vertical tube of the arm. It may, however, be formed of several sections for ease of fitting and removal.

Any suitable means can be used for moving the arms relative to the wall of the reaction chamber, but it has been found most convenient to attach the arms rigidly to the end of the reactant supply pipe which projects into the reaction chamber and rotate the reactant supply pipe about its longitudinal axis from outside the reaction chamber, thus causing the necessary movement of the arms relative to the wall. The reaction chamber in this case may suitably be cylindrical, but this is not essential. Thus, the wall of the reaction chamber may be inclined inwardly or outwardly, and a vertical cross section thereof need not be straight sided; for example, the wall may be stepped. Normally, the cross section of the reaction chamber perpendicular to the axis thereof will be circular at all points along the length of the axis, even if the radius of such circular cross section may vary from point to point along such axis, as in the cases of the inclined or stepped wall mentioned above. The scraper device will, of course, be shaped so that it can effectively scrape the wall.

As indicated above, the scraper device may be formed in one with the arm, for example by providing a ridge or other projection on the arm. Alternatively, the scraper device may be formed separately from the arm and attached thereto, for example by fitting a scraper edge on brackets provided on the arm. Shaping the scraper device so that it can effectively scrape the wall may involve, if desired in a particular case, also shaping the arm.

If the chamber in fact has a circular cross section, as is normally preferred, the scraping may be effected, as previously noted, by providing two arms diametrically opposite each other on the reactant supply pipe and by rotating the latter through about 180°, i.e. about 90° in each direction from its median position. This rotation may be accomplished by means of an electric motor mounted near the supply pipe and operating through a screw and appropriate link mechanism with suitably placed motor reversal switches.

There are normally at least two ports in each of the arms of the scraper. More than two ports, for example from three to six ports, are usually preferable. The ports are normally spaced apart along the section of the arm parallel to the wall and are directed inwardly, for example generally towards the centre of the reaction chamber. It is preferred to provide each port with a number of smaller outlet holes into the reactor, for example three or more.

Where the arms are formed with a jacket, there will normally be a connection from the inner conduit across the space between this and the jacket terminating at each port as previously described. This allows the coolant to pass between the jacket and the inner conduit without coming into contact with the reactants introduced through the ports.

It may, however, be desirable to cool the scraper by contact with one or both reactants rather than by a separate coolant. This can be accomplished by passing a reactant or reactants down the arm through the inner conduit and then up between the jacket and inner conduit before allowing it or them to pass through the port in the arm into the reaction chamber.

In the oxidation of metal halides two reactants (metal halide and oxygenating gas) are normally introduced through the combined scraper and injector of the present invention and these are preferably premixed before injection into the reaction zone either before or after introduction into the reactant supply pipe. If it is desired to keep the reactants separate, then it is necessary to provide separate ducts for each reactant within the reactant supply pipe and the attached arms to the appropriate ports.

If desired, particularly when no to be used as coolant, one or both reactants can be preheated before introduction into the reactant supply pipe. For example, in the production of titanium dioxide by oxidation of titanium tetrachloride, it has been found convenient to preheat the titanium tetrachloride to a temperature from about 140° C. to about 400° C., before introducing it into the reactant supply pipe. This ensures that the titanium tetrachloride is completely vaporized before its injection into the reaction chamber. It may be desirable to preheat the oxygenating gas also, for example to prevent condensation of the metal halide when the reactants are mixed.

The metal halide introduced into the reaction zone may be provided with subsidiary additives if those are desired to affect the properties of the final metal oxide product. These additives may be contained by the metal halide when it enters the reaction zone, or they may be added separately to the reaction zone.

In the case of titanium tetrachloride, examples of such additives are aluminum trihalide and silicon tetrahalide.

Figure 1A:
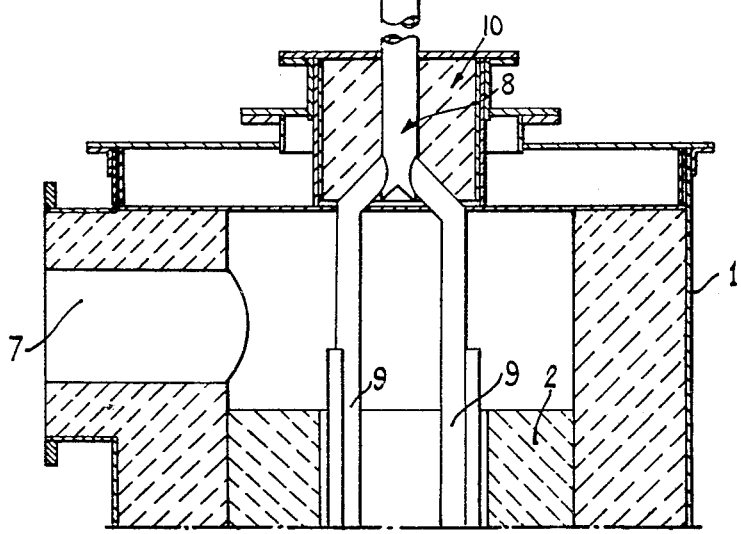
Figure 1B:
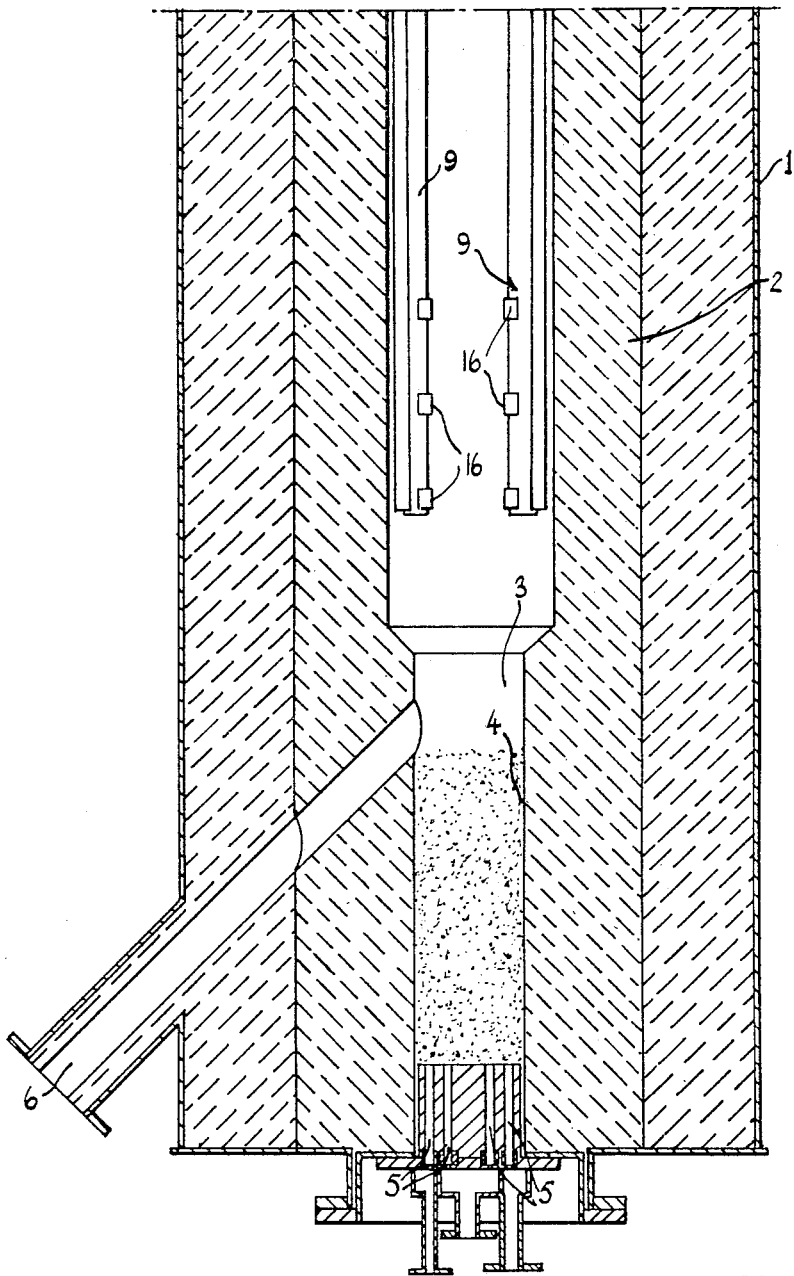
Figures 2A, 3:
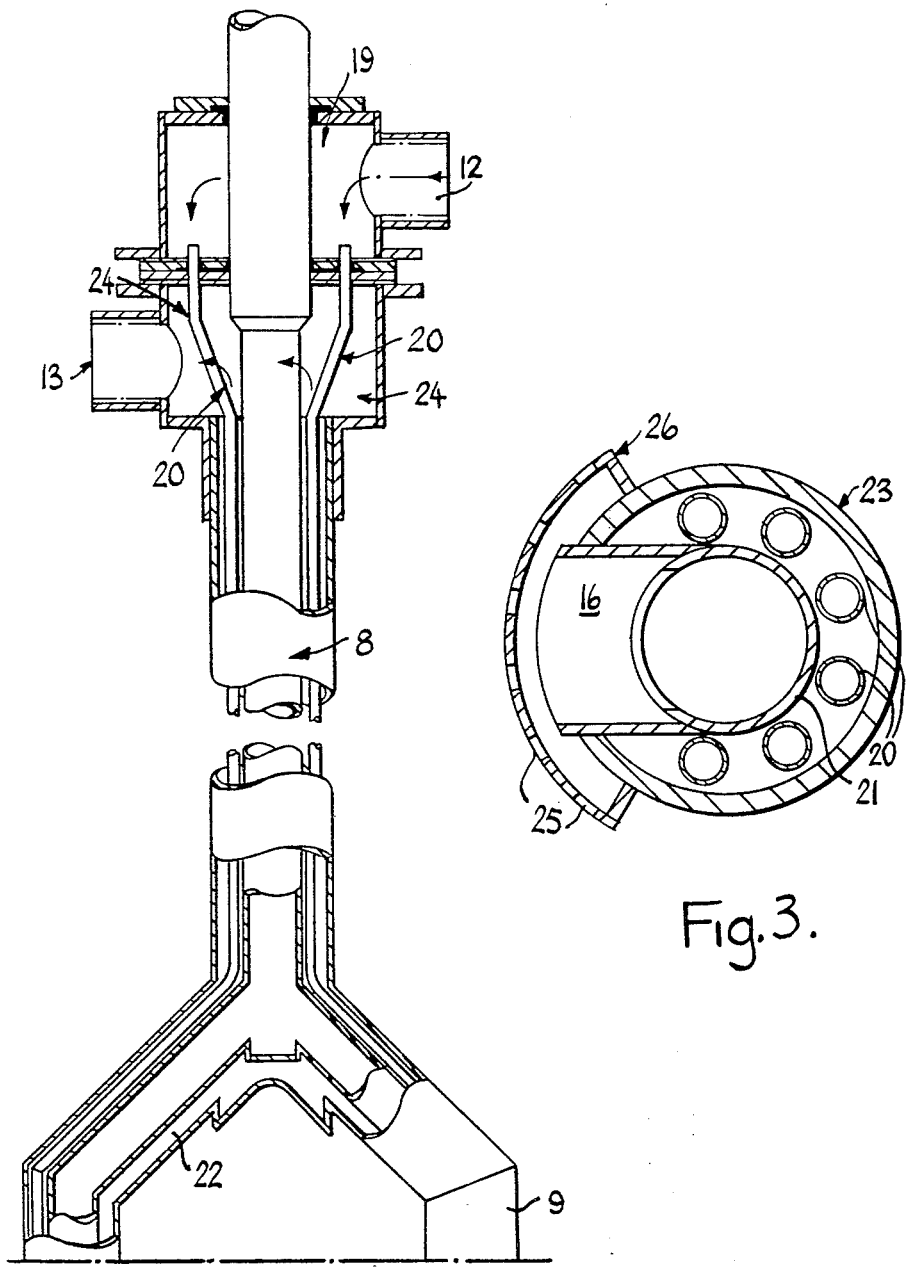

The attached drawing shows various details of one embodiment of the present invention. In the drawing:

FIGURE 1 is a diagrammatic view, mainly in section, of a reactor containing a combined scraper and injector according to the present invention (FIGURE 1 is divided into FIGURE 1a, which shows the upper portion, and FIGURE 1b which shows the lower portion of this combined scraper and injector);

FIGURES 2 and 3 show an enlargement details of the air cooling system of FIGURE 1; FIGURE 2 is partly in section (and is divided into FIGURE 2a, which shows the upper portion, and FIGURE 2b, which shows the lower portion); FIGURE 3 being an enlarged cross section of one arm of the device forming half of the lower part of FIGURE 2; and FIGURE 4 shows diagrammatically in partial cross section an enlarged view of an arm to which is attached a ceramic scraping edge.

Referring more particularly to FIGURE 1: A shaft furnace 1 is lined with chlorine resistant brickwork 2 which contains in the lower portion of reduced diameter 3 a bed of particles 4. The bed is fluidised by gases passing through ducts 5, and an overflow duct 6 is provided for the bed. Products are withdrawn from the exit duct 7.

The scraper/injector comprises a vertical reactant supply pipe 8 and two arms 9 which project downwardly into the upper part of the furnace 1. The reactant supply pipe 8 passes through the top plate 10 of the furnace 1, provided with sealing means to prevent escape of gaseous products from the furnace while allowing the reactant supply pipe 8 to rotate about its longitudinal axis. Coolant is supplied to port 12 and is withdrawn from port 13 after circulating through the arms 9, as more fully described below in connection with FIGURE 2. Reactants are introduced through flexible connections to pipes 14 and 15 and mix and are injected into the reaction zone through outlet ports 16 in the arms 9, as more fully described below in connection with FIGURE 2.

The scraper/injector is rotated through approximately 180° about its longitudinal axis by means of an electric motor with a screw and linkage system operated by suitably placed motor reversal switches (not shown).

Referring to FIGURE 2: A gaseous coolant, for example air, is introduced at super atmospheric pressure through port 12 and enters chamber 19. From the chamber the coolant enters twelve coolant pipes 20 arranged around the outside of the inner conduit 21 of the reactant supply pipe 8. The coolant pipes 20 pass down the reactant supply pipe 8 and half the pipes 20 then pass down each arm 9 to the bottom where they terminate in open ends. The coolant issues from the pipes and rises through a space 22 between the inner conduit 21 and an outer jacket 23 until it enters chamber 24 from which it is discharged through outlet port 13.

Referring to FIGURE 3: The coolant pipes 20, whose function is described above with reference to FIGURE 2, are disposed between the inner conduit 21 and the jacket 23. An outlet port 16 for reactants from the inner conduit 21 is also shown. As indicated in this figure, there is provided over the outlet port a distribution plate 26 suitably mounted on the jacket 23, the outlet port having through it a number of outlet holes 25 through which reactant passed down the conduit 21 is eventually passed into the open interior of the shaft furnace 1 lined with chlorine resistant brickwork 2 (these items 1 and 2 being shown, for example, in FIGURE 1).

Referring to FIGURE 4: A bracket 34 is attached to the outer surface of the jacket 23 of the scraper/injector arm 9 and a ceramic scraper structure 35 having a flanged recess is placed over the bracket 34.

The invention is illustrated by the following example.

A reactor similar to that shown in the drawings was set up having the following dimensions:

| | | |
|---|---|---|
| Height of reactor | inches | 144 |
| Internal diameter of upper portion of reactor | do | 18 |
| Internal diameter of lower portion of reactor | do | 12 |
| Height of lower portion of reactor | do | 57 |
| Height of fluidised bed | do | 33 |
| Distance between the surface of fluidised bed and lower outlets of the scraper/injector | do | 27 |
| Number of outlet ports in each arm of injector [1] | | 14 |
| Vertical distance between outlet ports on injector arms | inches | 10 |

[1] Each having 3 holes.

Before the nickel scraper/injector was inserted, the vertical arms were wound with asbestos string and covered with fireproof cement. Ceramic scraping blocks of a cross section similar to that shown in FIGURE 4 were fitted to the brackets on the vertical arms of the scraper/injector to provide scraping surfaces over the whole length of the vertical arms of the assembly.

Sufficient titanium dioxide particles having a mean diameter of about 200 to 350 microns were placed in the reactor to give a fluidised bed about 33″ in depth and a gas poker was introduced through the open top of the reactor and this was retained in the reactor until the inside of the reactor and the bed had been heated to about 1150° C. The poker was then withdrawn from the top of the furnace, and the attached scraper/injector assembly was lowered into place and secured. Oscillation of the assembly about its longitudinal axis was commenced through about 180° and cooling air was passed through the assembly, initially, at a rate of about 150 cubic ft./min. This was reduced as a layer of $TiO_2$ was deposited on the vertical arms of the scraper/injector.

Titanium tetrachloride was then admitted through the bed at a rate of 5 lb./min. and at a preheat temperature of about 150° C. It contained sufficient $SiCl_4$ vapour to give 0.12% $SiO_2$ (on $TiO_2$ produced in the fluidised bed). Oxygen was separately admitted to the bed at a rate of 22.5 cubic ft./min. and at a temperature of about 120° C. To the oxygen was added $AlCl_3$ at a rate of about 10 lb./hr.

A continuous fed of undersized $TiO_2$ particles was supplied to the bed to maintain a mean bed particle size of about 300 to 350 microns during operation and titanium dioxide particles were allowed to overflow through the downwardly inclined part to maintain the level of the fluidised bed. Some of the particles were recovered from the overflow, treated with sufficient aqueous $K_2CO_3$ solution to give a potassium content (as $K_2O$ on the $TiO_2$ produced in the bed) of 0.08%, dried and returned to the fluidised bed at a rate of about 20 lb./hr.

Propane was also supplied to the bed at a rate of 3.5 lb./hr. to maintain the bed temperature at about 1100° C.

$TiCl_4$ was then admitted through the scraper/injector assembly at a rate of 5 lb./min. together with sufficient $SiCl_4$ to give 0.5% $SiO_2$ on $TiO_2$ and 15 cubic ft./min. oxygen. The preheat temperature of the $TiCl_4$ was 180° C. and of the oxygen 110° C. The gases mixed substantially completely before entering the reactor.

The process was carried out over an extended period without difficulty and the pigment produced had a tinting strength (on the Reynold's scale) of 1800 and was of excellent brightness. It contained more than 98% of its $TiO_2$ content in the rutile form.

When the process was closed down and the scraper/injector withdrawn, it was found that very little deposit had formed in the area scraped by the scraper/injector.

What is claimed is:

1. In a process for producing pigmentary metal oxide by the vapor phase oxidation of metal halide in a closed reactor, the improvement which comprises the steps of
    (a) progressively scraping the internal walls of said reactor to remove accumulated oxide therefrom by moving a mechanical scraping element against a face of said walls;
    (b) continuously feeding reactant to an injection zone maintained in said reactor in close proximity to a wall portion then being scraped; and
    (c) continuuosly injecting reactant from said injection zone into said reactor in a generally inward direction away from said wall portion.

2. A method in accordance with claim 1 wherein said scraping is effected by moving a scraping element progressively against the internal walls of said reactor.

3. A process in accordance with claim 2 comprising supporting said scraping element by means of a reactant supply ducting provided with an injection port in close proximity to said scraping element; effecting steps (b) and (c) by passing a reactant through said reactant supply ducting and through said injection port into said reactor; and moving said scraping element to effect step (a) by moving said reactant supply ducting.

4. A process in accordance with claim 3 wherein the reactant being fed is passed in heat-exchange relation with said reactant supply ducting and wherein the feed rate of said reactant is sufficient high to maintain said reactant supply ducting and injection zone at a temperature below the corrosion and thermal breakdown temperatures of the involved materials of construction.

5. A process in accordance with claim 4 wherein the different reactants are separately fed into said reactor and said feed rate of reactant fed through said reactant supply ducting is sufficiently low to permit heating up of said reactant to an extent that it is injected into said reactor in step (c) at reaction temperature.

6. A process in accordance with claim 3 wherein said reactant supply ducting is provided with an inner conduit and an outer conduit and wherein a cooling fluid is passed in heat exchange relation therebetween, the rate of said cooling fluid being sufficient to maintain said reactant supply ducting and injection zone at a temperature below the corrosion and thermal breakdown temperatures of the involved materials of construction.

7. A process in accordance with claim 6 wherein the reactants for said process are premixed and fed as a mixture through said supply ducting and injection port into said reactor and wherein the rate of said cooling fluid is sufficient to maintain said reaction mixture in said reactant supply ducting at a temperature below the reaction temperature of said reactants.

8. A process in accordance with claim 1 wherein said pigmentary oxide is titanium dioxide, said metal halide is titanium tetrachloride, and said reactant comprises titanum tetrachloride.

References Cited

UNITED STATES PATENTS

| | | | |
|---|---|---|---|
| 2,155,119 | 4/1939 | Ebner | 23—1 |
| 2,805,921 | 9/1957 | Schaumann. | |

OSCAR R. VERTIZ, *Primary Examiner.*

E. STERN, *Assistant Examiner.*